United States Patent [19]

Migrin et al.

[11] Patent Number: 4,814,563
[45] Date of Patent: Mar. 21, 1989

[54] CONTACT MECHANISM FOR A SWITCH

[75] Inventors: Robert S. Migrin; David V. Tinder, both of Dearborn, Mich.

[73] Assignee: United Technologies Automotive, Inc., Dearborn, Mich.

[21] Appl. No.: 656,842

[22] Filed: Oct. 2, 1984

[51] Int. Cl.[4] ............................................. H01H 1/50
[52] U.S. Cl. ................................. 200/260; 200/11 A; 200/243; 200/16 B
[58] Field of Search .................... 200/4, 11 D, 11 DA, 200/11 TW, 11 J, 16 B, 16 C, 16 D, 61.54, 61.27, 156, 243, 252, 257, 259, 260, 261, 292, 285, 286, 11 A

[56] References Cited

U.S. PATENT DOCUMENTS

| | | | |
|---|---|---|---|
| 2,077,503 | 4/1937 | Winning | 200/6 |
| 2,254,729 | 9/1941 | Bryant et al. | 200/154 |
| 2,496,917 | 2/1950 | Poitras | 200/286 |
| 2,506,787 | 5/1950 | Hobart | 200/260 |
| 2,512,788 | 6/1950 | Brown et al. | 200/16 |
| 2,521,561 | 9/1950 | Batcheller | 200/16 |
| 2,626,998 | 1/1953 | Coombes | 200/243 |
| 2,675,448 | 4/1954 | Knudson | 200/260 |
| 2,956,255 | 10/1960 | Maartmann-Moe | 338/172 |
| 3,283,088 | 11/1966 | Scow et al. | 206/6 |
| 3,319,016 | 5/1967 | Hoy et al. | 200/16 |
| 3,511,943 | 5/1970 | Kibler | 200/4 |
| 3,511,952 | 5/1970 | Wilkinson | 200/166 |
| 3,531,603 | 9/1970 | Ashman | 200/11 |
| 3,629,526 | 12/1971 | Lewis | 200/16 C |
| 3,632,907 | 1/1972 | Gleeson | 200/4 |
| 3,686,449 | 8/1972 | Black, III et al. | 200/61.27 |
| 3,983,352 | 9/1976 | Ellis, Jr. et al. | 200/11 |
| 4,129,757 | 12/1978 | Cryer | 200/4 |
| 4,144,429 | 3/1979 | Ascoli | 200/164 |
| 4,196,322 | 4/1980 | Hattori | 200/5 R |

FOREIGN PATENT DOCUMENTS 2323969 11/1974 Fed. Rep. of Germany ...... 200/260
1099935 9/1955 France ............................... 200/11 J Primary Examiner—Henry J. Recla
Assistant Examiner—Linda J. Sholl

[57] ABSTRACT

A switch having a carriage with a pair of substantially opposite sides and a contact surface of conductive parts facing one of the sides and a reaction surface facing the other of the sides in spaced relation therewith, and wherein the carriage is movable relative to and substantially parallel with the contact surface and the reaction surface, and has an improved contact mechanism carried by the carriage. The carriage has plural openings extending therethrough perpendicular to the contact surface and the reaction surface. The contact mechanism comprises a respective plurality of plungers, springs, conductive contact members and a common conductive retainer. Each contact member is slidably disposed in a respective one of the carriage openings and is adapted for engagement with the contact surface. Each spring is interposed in compression between a respective contact member and a respective plunger. Each plunger is in contact with the reaction surface to urge the respective contact member into engagement with the contact surface. Each plunger includes a head portion and a pin depending from the head portion. Each contact member is hollow and open at its end facing the reaction surface and includes a shoulder in the hollow which faces the open end. The retainer is structured to allow limited resilient deflection of one end relative to the other in a direction axially of the carriage openings, but to be substantially rigid to forces applied in a transverse direction.

10 Claims, 6 Drawing Sheets

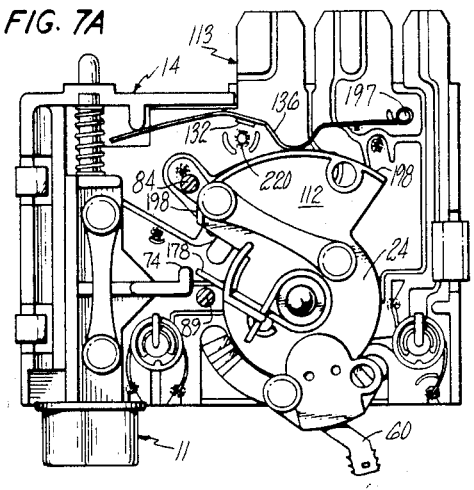
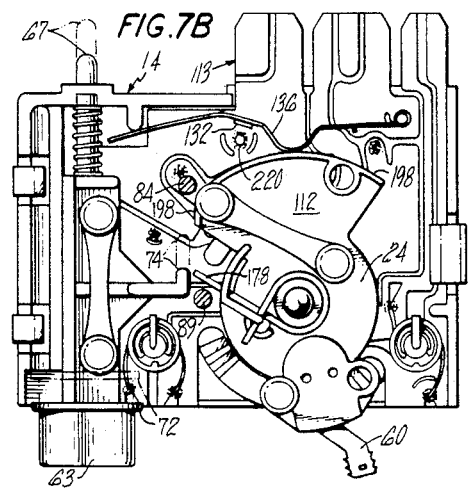
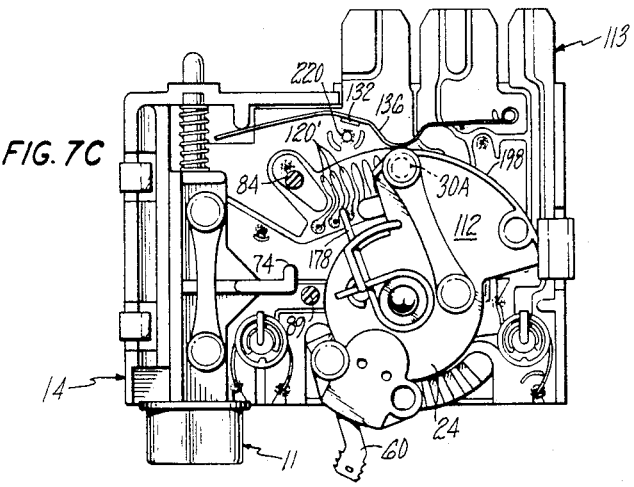
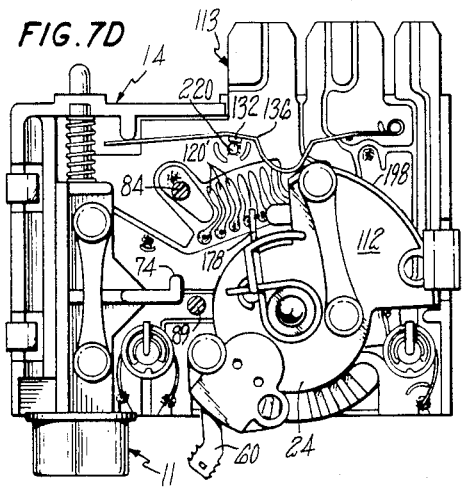
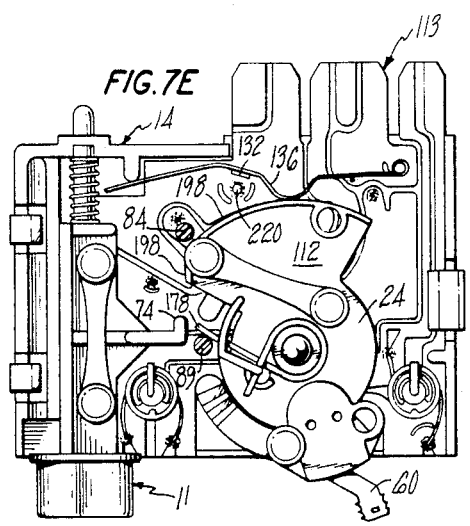

CONTACT MECHANISM FOR A SWITCH

TECHNICAL FIELD

The present invention relates to a contact mechanism for use in a switch and more particularly to an electrical contact mechanism for use in switches such as automotive washer/wiper switches.

BACKGROUND ART

The electric switch art has undergone considerable development. Very broadly stated, a broad range of switches have generally included a pair of electrical contacts which require relative displacement into and out of electrically-conductive contacting relationship to respectively make and break an electrical circuit. In many instances, at least one of the electrical contacts is transported by a movable member or carriage which is typically manually actuated to make or break the engagement between contacts.

While a variety of designs and arrangements have existed for such contact members and contact mechanisms, a general arrangement often used involves the seating of a spring-biased contact member in the recess of a movable carriage. General examples of such contact configuration employing electrical contact members are illustrated in U.S. Pat. Nos. 2,254,729, 3,319,016, 3,531,603, 3,983,352 and 4,144,429. Examples of switches employing non-conductive detenting contact members of a similar configuration or disposition are found in U.S. Pat. Nos. 3,511,943, 3,511,952 and 4,129,757. Specific utilization of such contact member configurations or mounting arrangements in automotive washer/wiper switches are found in U.S. Pat. Nos. 3,632,907 and 4,196,322.

A further arrangement for supporting a contact mechanism, within a switch is illustrated in U.S. Pat. Nos. 2,077,503, 2,512,788, 2,521,561, 2,956,255 and 3,283,088. In those instances, the movable carriage of the switch includes an opening therethrough in which the contact element is slidably positioned. More specifically, a pair of generally identical contact elements are slidably disposed at opposite ends of the carriage opening and are biased outwardly by an intermediate spring. Such arrangement provides electrical contact or mechanical detenting at the opposing contact faces adjacent the carriage and minimizes any tendency for the carriage to be cocked or to bind as a result of the spring bias force.

Most of the aforementioned switch contact arrangements, while suited for providing electrical connection from a contact on one side of the carriage to a contact on the other side of the carriage, are generally not concerned with providing such electrical connection with a contact surface at only one side of the carriage.

DISCLOSURE OF INVENTION

It is an object of the present invention to provide an improved switch contact mechanism of the type which slidably mounts a contact member in an opening extending through a movable carriage. It is a further object to provide such a switch contact mechanism suitable for providing electrical connection between a pair of contact surface locations both disposed on the same side of the carriage. It is a further object of the invention to provide an improved contact mechanism of a design which facilitates assembly of the switch and allows at least limited displacement of individual contact members relative to the carriage.

In accordance with the invention, there is provided in a switch having a carriage with a pair of substantially opposite sides and a contact surface of conductive parts facing one of the carriage sides and a reaction surface facing the other of the carriage sides in spaced relation therewith, and wherein the carriage is movable relative to and substantially parallel with the contact surface and the reaction surface, an improved arrangement of the contact mechanism carried by the carriage. The carriage has a plurality of openings extending therethrough each substantially perpendicular to the contact surface and the reaction surface. The contact mechanism comprises a respective plurality of plungers, springs, conductive contact members and a common conductive retainer. Each contact member is slidably disposed in a respective one of the carriage openings and is adapted for engagement with the contact surface. Each spring is interposed in compression between a respective contact member and a respective plunger. Each plunger is in contact with the reaction surface to urge the respective contact member into engagement with the contact surface. The retainer connects the respective plurality of contact members both conductively and structurally in common.

In an illustrated embodiment, a pair of contact members are joined by a retainer and are separately disposed in a respective pair of openings in the switch carriage. The contact members are typically affixed to the opposite ends of the retainer, as by riveting. The retainer is elongate and sufficiently thin in one direction to allow limited resilient deflection of one end relative to the other in a direction axially of the carriage openings, but is sufficiently wide in a direction transversely of that one direction to be substantially rigid to forces applied in that transverse direction. Such structure allows limited independent displacement of one contact member relative to the other, axially of the carriage.

Each plunger includes a head portion and a pin depending from the head portion. Each contact member is hollow and open at its end facing the reaction surface and includes a shoulder in the hollow which faces the open end. The spring, which is a coil spring, has one end received in the hollow contact member in axial engagement with the contact member shoulder, and the other end coaxially encircles the plunger pin and is in axial engagement with the plunger head portion. Each contact member is of such length that when one end is in engagement with the contact surface, the opposite end portion extends beyond the surface of the carriage facing the reaction surface and the retainer member is affixed to that opposite end portion of the contact member in spaced relation with the carriage. The switch carriage and contact mechanism are contained within a plastic housing, with the reaction surface being provided by an internal surface of the housing. The plunger is of molded plastic and has a relatively low coefficient of friction for sliding engagement with the reaction surface.

BRIEF DESCRIPTION OF THE DRAWINGS

FIG. 4B illustrates, in phantom, the washer switch in its actuated position and the wiper switch thereby actuated to its "low" speed position;

FIG. 4C illustrates the wiper switch in its "high" speed position;

FIG. 4D illustrates the washer switch actuated to its "mist" position;

FIGS. 7A–7E are plan views of the switch of FIG. 5, with the cover removed, showing the washer and wiper switches in various operating positions and wherein FIG. 7A illustrates the switches in their "off" position;

FIG. 7B illustrates, in phantom, the washer switch actuated without also actuating the wiper switch;

FIG. 7C illustrates the wiper switch positioned in a range of delay operating positions;

FIG. 7D illustrates the wiper switch in its "high" speed position; and

FIG. 7E illustrates the wiper switch actuated to its "mist" position.

BEST MODE FOR CARRYING OUT THE INVENTION

Figure 1:
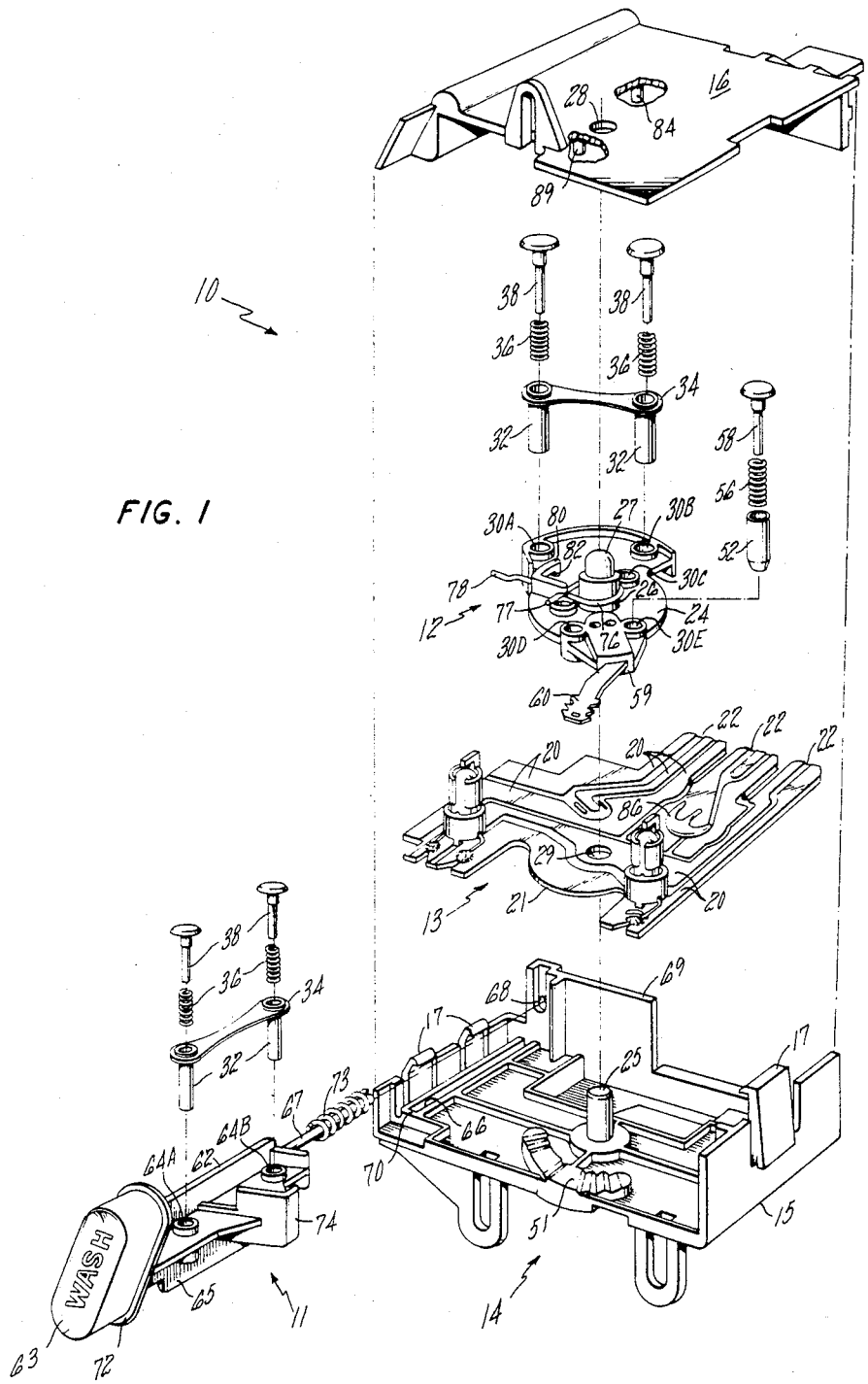
FIG. 1 is an exploded view of a washer/wiper switch.

Referring to FIG. 1 there is illustrated in exploded form, a washer/wiper switch assembly 10. The switch assembly 10 includes a washer switch carriage assembly 11 and a wiper switch carriage assembly 12 each mounted for displacement relative to a circuit board assembly 13 and collectively positioned and mounted within a housing 14 comprised of a base portion 15 and a cover portion 16. For the purposes of the following description, the washer/wiper switch 10 will be presumed to have a particular spatial orientation in which the base portion 15 is lowermost, the cover 16 is uppermost and manual activation occurs at a forward end, however it will be appreciated that such orientation is only to facilitate description of the interrelationship of the component parts and other spatial attitudes are possible.

The housing 14 is preferably formed of molded plastic, with the base portion 15 serving as the principal mounting surface for the circuit board assembly 13, the washer switch carriage assembly 11, and the wiper switch carriage assembly 12. The housing base portion 15 is designed to cooperatively engage with cover 16, as by snap locks 17 to provide the housing closure 14 for the switch elements. The housing 14 is of relatively rigid construction so as to provide a substantially-rigid geometrical configuration, for reasons to be appreciated more fully hereinafter.

The circuit board assembly 13 comprises a selected pattern of conductive contact surfaces, generally designated 20 and disposed, as by printing or etching or other suitable manner, on a substantially rigid substrate 21, as for instance a glass-epoxy material. The various separate parts 20 of the conductive contact pattern lead to one or more terminal tabs 22 formed at the rear edge of the circuit board for connection in a known manner via an electrical connector (not shown) with a respective washer pump motor, (not shown) and a two-speed wiper motor (not shown). The switching action of switch 10 is provided by displacement of one or both of the washer switch assembly 11 and the wiper switch assembly 12 to respective selected positions by which selected conductive pattern parts 20 are electrically connected to one another by an electrical contact arrangement carried by and forming part of the respective washer switch carriage assembly 11 or wiper switch carriage assembly 12.

Referring to the wiper switch carriage assembly 12, a molded plastic rotor 24 is adapted to rotate about a vertical axis defined by pintle 25 extending upwardly from and formed integrally with the housing base portion 15. The rotor 24 includes an axially-extending cylindrical hub 26 extending both upwardly and downwardly from the rotor for rotatingly encircling the pintle 25. The upper portion of rotor hub 26 is closed and domed to provide a secondary pintle 27 for rotatable insertion through an opening 28 in the cover 16. The circuit board assembly 13 is supported in direct engagement with the housing base portion 15, with pintle 25 extending upwardly through an opening 29 in the circuit board assembly. The hub 26 of rotor 24 is rotatably disposed on pintle 25, and the axial extent of hub 26 below rotor 24 is such that the lower end-face of that hub is in sliding bearing engagement with an upper surface of the circuit board assembly 13. The rotor 24 includes five circular openings $30a$, $30b$, $30c$, $30d$ and $30e$, respectively, extending axially therethrough at various locations radially spaced from the hub 26. All of the openings $30a-e$ are of the same diameter, with openings $30a-c$ being positioned generally rearwardly of hub 26 and openings $30d$ and $30e$ being positioned generally forwardly of the hub in the various operating orientations of rotor 24. In the illustrated embodiment, much of the body of rotor 24 is relatively thin axially, however, the openings $30a-e$ are each positioned in portions of the hub having a significant axial extent, i.e., about 0.35 inch.

Two of the three rearward openings $30a-c$ in rotor 24 serve to house a respective pair of electrical contact members 32. Contact members 32 are joined by an electrically conductive retainer 34 to provide the requisite electrical connection therebetween. The pair of conductive contact members 32 are housed in openings $30a$ and $30b$, respectively, with opening $30c$ being unused in the present embodiment but finding use in an alternate embodiment to be hereinafter described.

Figure 2:
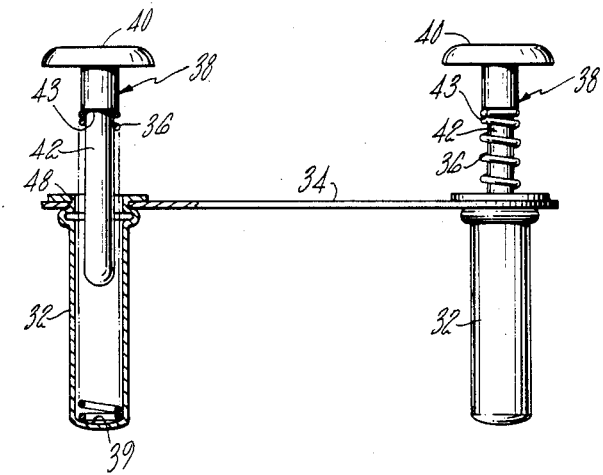
FIG. 2 is a view, partly in section, of the contact arrangement employed in the switch of FIG. 1.
Figure 3:
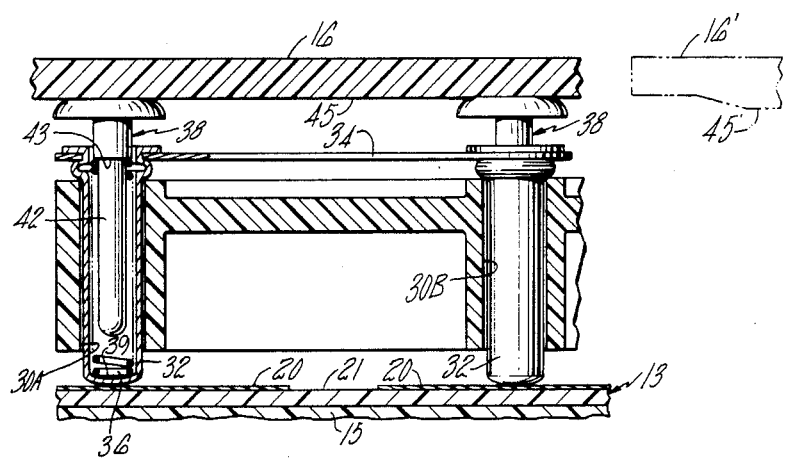
FIG. 3 is a further view of the contact arrangement of FIG. 2 operatively positioned in the switch assembly of FIG. 1.

Referring additionally to FIGS. 2 and 3, each contact member 32 is tubular and is open at its upper end for receiving a spring 36 and plunger 38, and is closed at its lower end to provide a seat or shoulder 39 for the lower end of spring 36 and to provide the surface which is in conductive contact with a conductive pattern part 20 on the circuit board substrate 21. Each contact member 32 is part of a contact mechanism or assembly which also includes the spring 36 and the plunger 38. The contact member 32 is so sized in the radial direction as to ensure a free-sliding relation with the rotor 24. Contact spring 36 is a coil spring sized for seated insertion within the contact member 32 and adapted for compression between shoulder 39 of contact member 32 and the plunger 38. The plunger 38 may be of plastic or the like and includes a head portion 40 and a pin 42 depending from the head portion. More specifically, the plunger head portion 40 includes an uppermost portion having a diameter greater than the outside diameter of the contact member 32 and a neck portion depending therefrom of lesser diameter than the inside diameter of member 32. The pin 42 depends from and is of lesser diameter than the neck portion, forming a downwardly facing shoulder 43 at the transition. Pin 42 is axially, slideably inserted within the spring 36 and its position is stop-limited by engagement of the upper end of the spring with the shoulder 43.

The upper surface of head 40 of plunger 38 preferably has a low coefficient of friction and is intended to be in substantially continuous engagement with a reaction surface which urges the plunger 38 downwardly against the bias of spring 36. Such downward force applied to the plunger 38 serves to load the spring 36 and accordingly apply a downward force to the contact member 32 to ensure good electrical contact with the contact pattern parts 20 of circuit board assembly 13. Conveniently, the reaction surface is provided by the inner or undersurface 45 of the cover 16 along the track described by plunger head 40 as rotor 24 rotates. The reaction surface 45 might alternatively be considered as a camming surface and, in the preferred embodiment, is substantially flat and is maintained at a substantially constant spacing from the contact pattern parts 20 of the circuit assembly 13. However, as illustrated by broken lines in a part of FIG. 3, the cover 16' might have a camming or reaction surface 45' which is not planar, and thereby varies the spacing with the circuit assembly 13 such that the downward force applied to the contact member 32 is accordingly varied.

With the aforementioned arrangement of a contact mechanism, a predetermined, and for that matter variable, spring force may be applied to the contact member 32 for urging it into good electrical contact with contact pattern part 20. Moreover, because the contact member 32 is free to slide within the wiper switch carriage assembly 12 and the reaction forces are applied substantially only on the fixed components such as cover 16 and the circuit assembly 13 and housing base portion 15, there is no off-center axial force applied to rotor 24 which might cause it to cock or bind.

To provide electrical connection between a pair of spaced and insulated contact pattern parts 20 on the printed circuit assembly 13, it will normally be necessary to have two contact members 32 in contact with respective contact pattern parts 20 and electrically connected by means such as retainer 34. Of course, instances may exist in which more than two contact members are joined electrically in common. It is preferable that each of the commonly-connected contact members 32 be capable of at least some degree of axial displacement relative to one another to accommodate any irregularities or camming contours in the upper or lower reaction surfaces contacted. Such independent axial flexibility minimizes the possibility of one contact member 32 becomming skewed or cocking within its respective opening in the rotor 24. To afford such independent axial motion, the conductive retainer 34 connecting a pair of contact members 32 is structured such that it is resiliently yieldable in a direction commensurate with axial motion of the contact 32 but is relatively rigid to forces acting in a direction transverse to the axial direction. Specifically, retainer 34 is a 0.010 inch thick oblong copper member having a length of approximatley one inch and a width at its narrowest of approximately 0.13 inch. A pair of circular openings 48 are formed through retainer 34 near its opposite ends. The upper ends of respective contact members 32 extend through respective openings 48 and are rigidly joined thereto as by a rivet-type of deforming of the upper end of the contact member 32 as illustrated in FIGS. 2 and 3. In those instances in which transverse or radial rigidity or stability of the relative positionings of contact members 32 is not particularly necessary, the retainer 34 might take an alternate form, as for instance, that of a conductive wire which may be bonded to the respective contact members.

One of the two openings 30d and 30e is used to slideably house a detenting element, such as detent member 52 which is biased into detenting engagement with a slotted detent contact surface 51 formed on the housing base portion 15. The detent member 52 is generally similar in structure to an electrical contact member 32, however, it typically is of a rigid nonconductive plastic material, and its lowermost end which is adapted for detenting engagement with the detent contact surface 51 may be somewhat more tapered than that of an electrical contact member 32 and its upper end is not connected with any retaining member. As in the instance of the electrical contact members 32, the detenting member 52 is urged into detenting contact with detent surface 51 by means of a coiled compression spring 56 and a force-transmitting plunger 58. The plunger 58 may be substantially identical with the plungers 38 and the interrelationship of detent member 52, spring 56 and plunger 58 is substantially identical with that of contact member 32, spring 36 and plunger 38. Depending upon the detenting forces required, the spring 56 may have a greater or lesser spring force than that of spring 36. A reaction force is delivered to plunger 58 via the undersurface 45 of housing cover 16.

A forwardly-extending appendage 59 on rotor 24 rigidly mounts a metal stem or actuator arm 60 to which a thumb button (not shown) may be affixed for applying a manual rotating force to rotor 24.

Referring again to FIG. 1, the washer switch carriage assembly 11 includes a manually actuated, linearly displaceable actuator or carriage 62 having a finger button 63 suitably affixed to a mounting flange 72 at the forward end thereof and including spaced openings 64a and 64b extending vertically therethrough for mounting respective electrical contacts 32. The washer carriage 62 is formed of rigid molded plastic and includes a longitudinally-extending guide bar 65 depending therefrom for reciprocable sliding displacement within a complementary guide slot 66 molded in housing base portion 15 toward one side thereof. The guide slot 66 extends in a fore and aft direction for reciprocation of carriage 62 in that direction. Washer carriage 62 additionally includes a guide pin 67 extending rearwardly from a rear surface thereof for sliding insertion through an opening 68 in the rear wall 69 of housing base portion 15. The opening 68 is sized and positioned to provide alignment and support for the rear end of carriage 62 at rest and during reciprocation.

A transversely extending ridge or wall 70 is formed in the housing base portion 15 at the forward end of guide slot 66 to define a stop member which limits displacement of the washer carriage 62 in each direction. Specifically, the forward end of carriage guide bar 65 contacts the rear face of stop wall 70 to define a first operating limit and the inner or rear face of mounting flange 72, which is spaced from guide bar 65, engages the forward face of stop wall 70 to define a second operating limit position. A coil spring 73 encircles the guide pin 67 intermediate the rear face of carriage 62 and is in compression for biasing carriage 62 to its outer limit position. The electrical contacts 32 associated with the washer switch carriage assembly 11 are the same as for the wiper switch assembly 12, and are connected by a retainer 34 and are urged into electrical engagement with the circuit board assembly 13 by respective springs 36 and respective plungers 38 as previously described.

The openings 64a and 64b in washer carriage 62 are positioned to the right or inwardly of the guide rail 65 so as to be in alignment with selected contact pattern parts 20 along the left side margin of the circuit board assembly 13. The patterning and positioning of the various contact pattern parts 20 associated with the contacts 32 of washer switch assembly 11 and with contacts 32 of wiper switch assembly 12 is such that retainer 34 in each instance may be of the same length to further facilitate interchangeability of parts.

A rigid appendage 74 is integrally formed with and extends transversely inward from washer carriage 62 to provide a drive member for transferring an actuating force from the washer switch assembly 11 to the wiper switch assembly 12 via a reaction member, such as torsion spring 76 affixed to rotor 24. The torsion spring 76 encircles rotor hub 26 and includes a short, radially extending tail or anchor portion 77 and a longer radially extending cantilevered arm portion 78. A spring mounting structure 80 formed on the upper surface of hub 24 includes a notch at one end which serves to anchor the tail 77 of the spring and further includes a circumferentially arcuate slot 82 extending radially therethrough for extension therethrough of the cantilevered spring arm 78. The relative configurations of the torsion spring 76 and the mounting slot 82 are such that the spring includes a slight preload which urges cantilevered arm 78 relatively counterclockwise to the limit of slot 82 as viewed from above in FIG. 1.

Figure 4A:
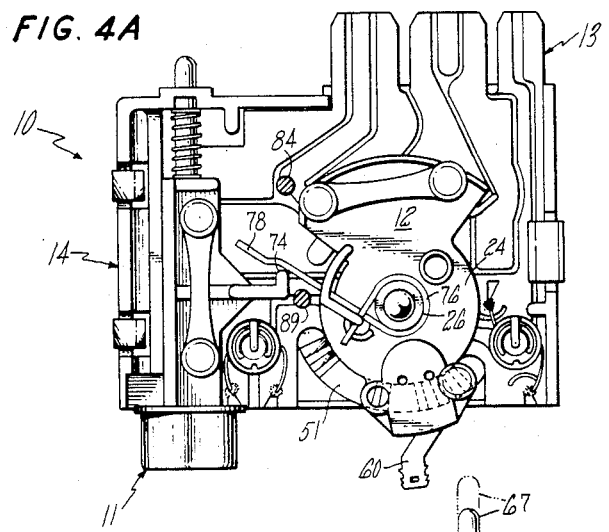
FIGS. 4A–4D are plan views of the switch of FIG. 1 with the cover removed and showing the respective washer and wiper switches in differing positions with FIG. 4A showing both switches in an "off" position.

When washer switch assembly 11 is manually actuated rearwardly against the bias of spring 73 to its limit position, its associated drive member 74 will correspondingly be displaced along a linear path. The length and elevation of the cantilevered arm 78 of torsion spring 76 are such as to place the spring in the displacement path of the wash actuator drive member 74 for certain limited angular orientations of the wiper rotor 24. Specifically, when the rotor 24 is at a detented angular position commensurate with an "off" electrical condition for the wiper motor as depicted in FIG. 4A, the spring arm 78 will pass rearwardly of drive member 74 with some small spacing therebetween.

Figure 4B:
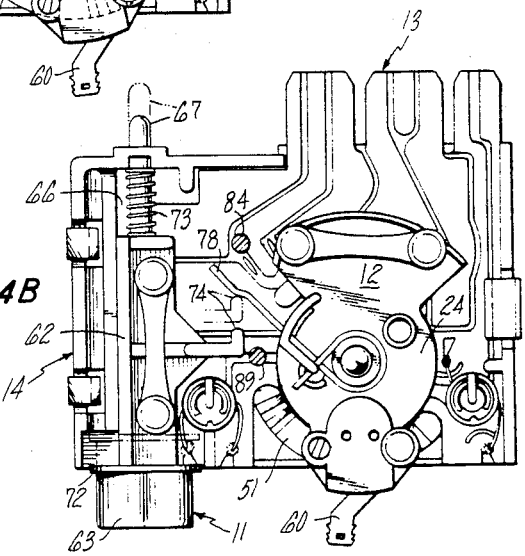

When the wash actuator carriage 62 is actuated rearwardly to its limit to energize the washer pump motor, as shown in phantom in FIG. 4B, the drive member 74 engages spring arm 78 and displaces it rearwardly also. Such rearward displacement of spring arm 78 is in a torsion-increasing direction on rotor 24 and is sufficient to overcome any detenting force of force detent member 52, thus resulting in clockwise rotation of rotor 24 to the position illustrated in FIG. 4B. The precise rotor orientation illustrated in FIG. 4B is determined principally by the angular positioning of one of the detent notches appearing on the detent contact surface 51 of the housing base portion 15. The displacement range of drive member 74 on washer actuator carriage 62 is such that, via torsion spring 76 it rotates rotor 24 just to the detented position illustrated in FIG. 4B and not beyond. In such position, electrical connection is made with the "low" speed winding of the wiper motor and is accordingly designated the "low" speed position.

Figure 4C:
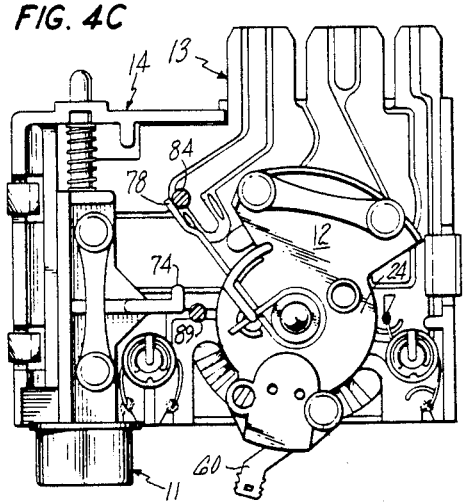

Referring to FIG. 4C, the wash actuator switch 11 is shown as having been released and returned to its "off" position and the wiper rotor 24 has been manually rotated clockwise, via stem 60, to the angular position which effects "high" speed operation of the wiper motor. The precise angular location of the "high" speed position of rotor 24 is determined by limiting engagement of spring arm 78 with a stop rod 84 molded with and depending from the underside of cover 16 and additionally by detenting engagement of detent member 52 with an appropriately-positioned notch in the detenting contact surface 51.

Figure 4D:
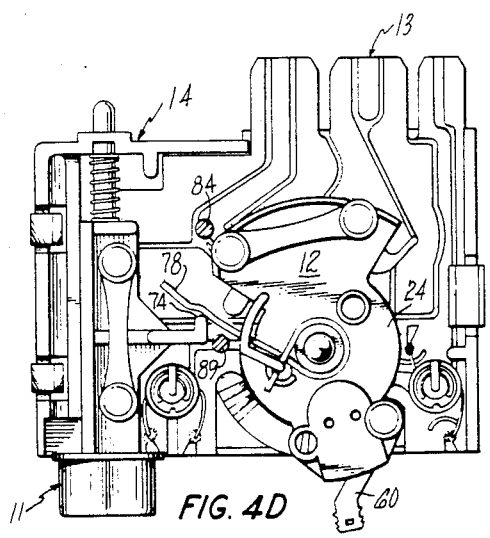

The wiper rotor 24 may also be manually rotated counterclockwise, via the stem 60, from any one of the aforementioned positions to a counterclockwise extreme represented in FIG. 4D and being designated as a "mist" position. The "mist" position is electrically the same as the "low" speed position of wiper operation and is intended for several sweeps of a wiper so long as the operator maintains the wiper switch assembly rotated to the "mist" position. Specifically, when rotor 24 is rotated counterclockwise from the "off" position (FIG. 4A), the spring arm 78 immediately engages the drive member 74 of wash carriage 62. However, because the wash carriage is at its "off" limit position, the drive member 74 now effectively serves also as a stop member to prevent further angular displacement of spring arm 78 relative to that member and to the housing 14 as a whole. On the other hand, because the spring mount 80 includes arcuate slot 82, some limited resilient angular displacement of spring arm 78 is permitted relative to rotor 24, or in other words, the rotor is permitted to rotate counterclockwise to a limited extent against the return bias force now provided by spring 78. Such counterclockwise displacement of rotor 24 from its "off" position is typically only a few degrees but is effective to provide the requisite electrical contact for "low" speed operation of the wiper motor. When the actuating stem 60 of rotor 24 is released, the rotor instantly returns to its "off" position represented in FIG. 4A.

Referring briefly to the circuit board assembly 13 as illustrated in FIG. 1, a plastic arc suppression pad 86 is affixed to the upper surface of one of the conductive pattern parts 20, as by heat staking to the substrate 21. The arc suppression pad 86 comprises three fingers oriented radially to the axis of rotation of rotor 24 to divide the particular contact pattern part 20 into three electrically identical, but physically separate regions along the path of electrical contact member 32 disposed in opening 30b of the rotor. The pad 86 is of sufficient thickness to cause the contact member 32 to raise away from the contact surface 20 as it crosses a respective finger. Such abrupt separation of a contact member 32 from a contact surface 20 aids in suppressing any electrical arc and further serves to concentrate any arcing on that pattern part. In this latter regard, it will be noted that the relevant pattern part 20 is of relatively large area and better suited for heat absorption than one or more smaller pattern parts 20 which may underlie the other contact member 32 housed in opening 30a.

Figure 5:
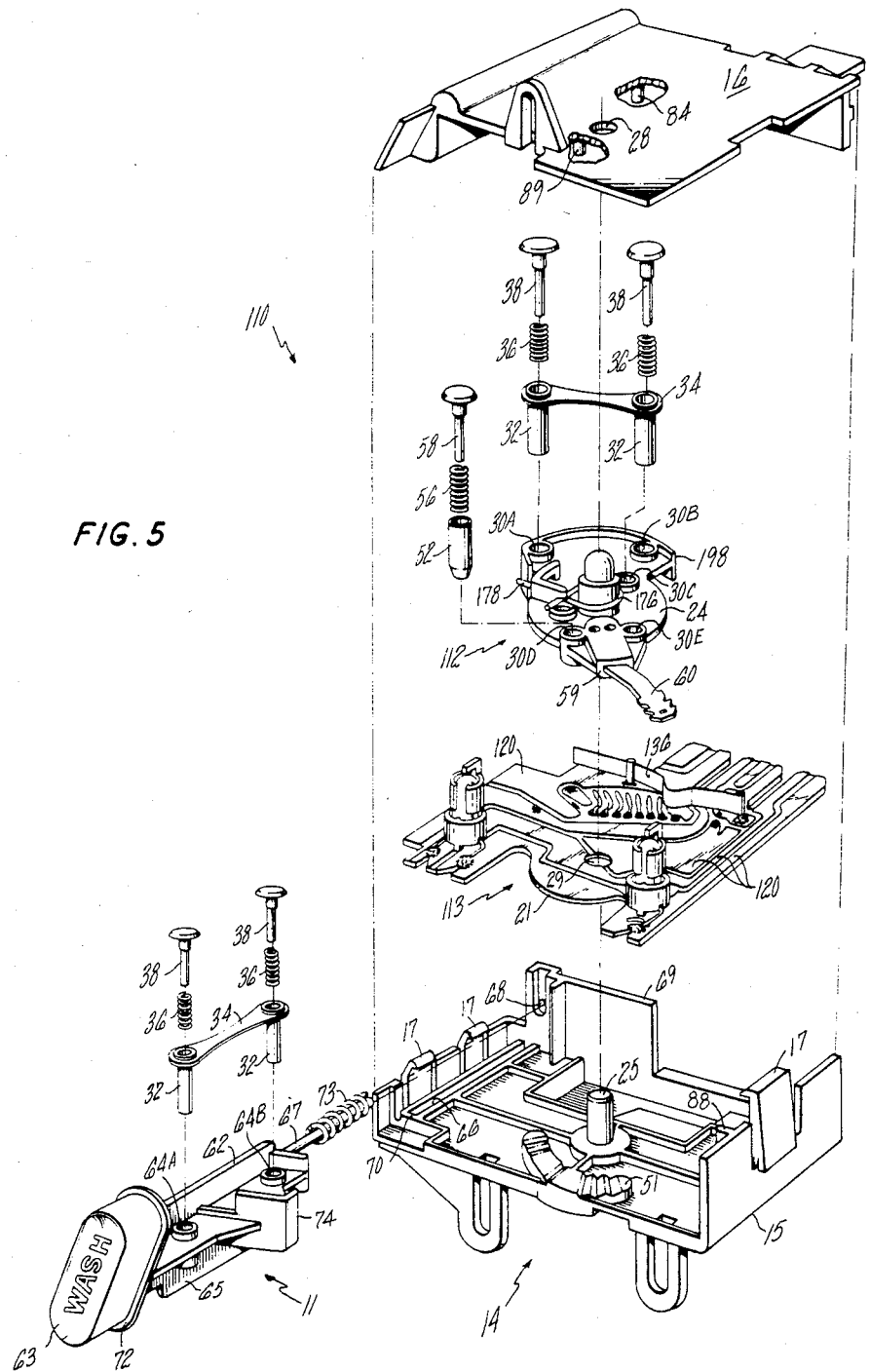
FIG. 5 is an exploded view of another washer/wiper switch including provision for intermittent, or delay, operation.

Referring now to FIG. 5 there is illustrated an exploded view of another embodiment of a washer/wiper switch assembly 110. Washer/wiper switch assembly 110 is identical in many respects to the washer/wiper switch assembly 10 of FIG. 1, and the parts identical in both will be similarly numbered and no further description given. Those aspects of switch assembly 110 which differ will accordingly receive different numerals and will be hereinafter described. Switch assembly 110 affords so-called "delay" or "intermittent" operation of a wiper whereby the delay or interval between successive sweeps of a wiper motor (not shown) may be incrementally varied. The circuitry (not shown) for effecting intermittent operation of the wiper motor is of a known type generally positioned directly at the wiper motor and capable of providing motor-operating pulses at intervals determined by a variable RC time constant. The variability of the RC time constant is provided by a variable resistance, the value of which is determined by the angular positioning of a wiper switch carriage assembly 112 relative to a circuit board assembly 113.

Carriage switch assembly 112 is in most respects identical to the carriage switch assembly 12 of FIG. 1 with the following exceptions. Firstly, the pair of contact members 32 are disposed in openings 30a and 30c of rotor 24. The detent member 52 is positioned in opening 30d of rotor 24. The actuator arm 60 extends from appendage 59 of rotor 24 at a rightward angle rather than a leftward angle. This is conveniently attained by forming the actuator 60 with a dog leg and simply inverting the actuator in the two different embodiments of FIGS. 1 and 5. Further, the torsion spring 176 differs in that its cantilevered arm 178 is shorter than arm 78 of spring 76 in the FIG. 1 embodiment for a reason to be hereinafter described.

The circuit board assembly 113 differs from the assembly 13 in the FIG. 1 embodiment in the following respects. The arc suppression pad 86 of the FIG. 1 embodiment has been omitted. The several individual conductive contact pattern parts 120 disposed on substrate 21 are arranged in different patterns than that of the FIG. 1 embodiment. Most significant in this regard is the generally arcuate array of generally radially-extending contact pattern fingers 120'. The array of contact pattern fingers 120' is arranged to underlie the arcuate path described by the contact member 32 disposed in opening 30a of rotor 24. In that arcuate path of contact with the contact member 32, each of the contact fingers 120' is relatively closely spaced to the next in the array to minimize the space occupied by the collective contact fingers in the array. In the illustrated embodiment, there are seven contact fingers 120' and a larger contact pattern part 120 having a finger-like projection forming the rightmost extreme of the array.

Figure 6:
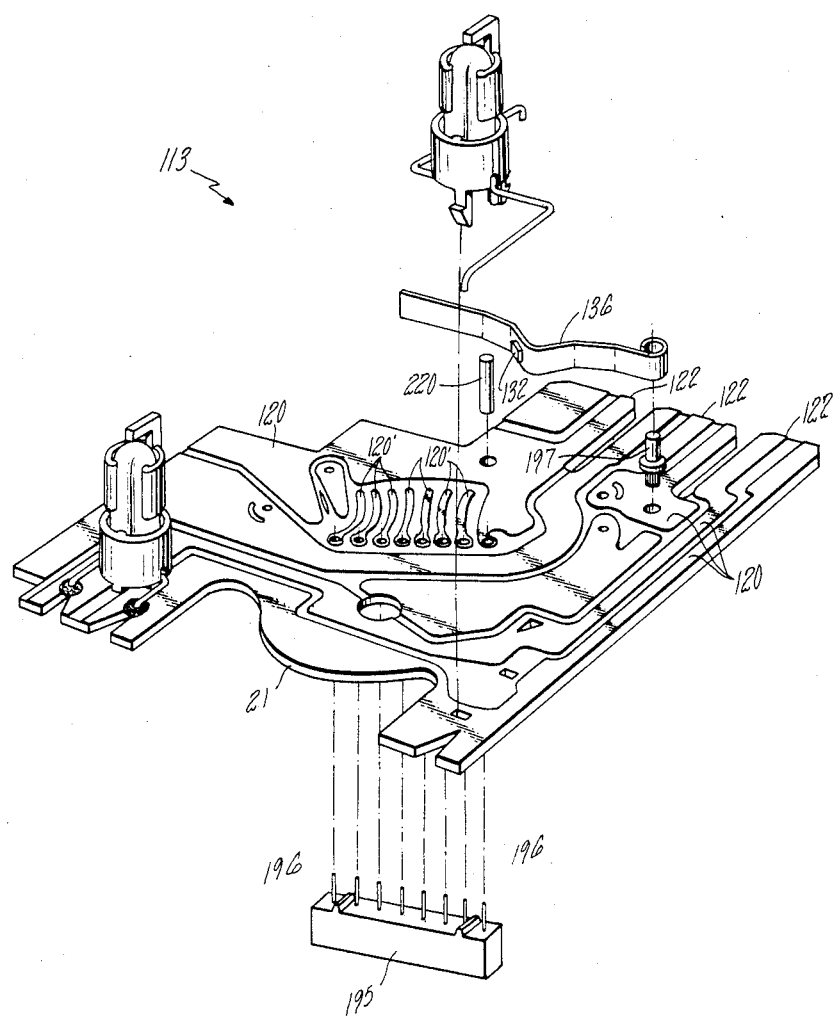
FIG. 6 is an exploded view of the circuit board utilized in the switch of FIG. 5.

An accurately-trimmed resistive element, such as a thick film resistor network 195 has multiple leads 196 which each represent a different resistive tap to the resistor network 195. The resistor network 195 may be conveniently manufactured and trimmed as a discrete element separate from the circuit board of assembly 113. In the embodiment of FIGS. 5 and 6, resistor network 195 is provided with eight leads 196, each lead providing a separate resistive tap and being electrically connected with a respective one of the contact fingers 120' (or 120) forming the aforementioned array. The housing base portion 15 is conveniently provided with recesses such that resistor network 195 may be disposed on the underside of circuit board substrate 21 and the leads 196 feed through the board for connection at its upper surface to the conductive pattern parts 120' and 120. Although the arcuate or circumferential width of the contact fingers 120' in the array is relatively narrow and the spacing therebetween is also narrow in that arcuate region described by the path of the contact 32 in rotor opening 30a, such spacing constraint may be more relaxed in other regions of the circuit board assembly 113 at which the contact members 32 do not make contact. Accordingly, it will be noted that the radially innermost ends of the array of contact fingers 120' are somewhat more widely spaced to accommodate the normally-wider spacing of the leads 196 from resistor network 195.

A further distinction existing on circuit board assembly 113 of the FIGS. 5 and 6 embodiment relative to that of the FIG. 1 embodiment is provided by a further contact 132 which is conductively affixed to and carried by an electrically conductive beam spring 136 having a fixed end electrically connected to one of the contact pattern parts 120, as via a conductive pin 197 mounted in substrate 21. A conductive contact pin 220 is mounted in the substrate 21 in electrical connection with another one of the contact pattern parts 120 and is positioned for selective switching contact with contact 132. Both conductive pins 197 and 220 are connected to the respective contact pattern parts relatively near the connection terminal tabs 122 of assembly 113 to minimize the resistance of the conductive path therebetween. By minimizing the resistance, any voltage drop and resulting heat are also minimized.

The beam spring 136 is formed and oriented such that a cam-following portion thereof is biased radially-inward into engagement with a radially-outward facing camming surface 198 of rotor 24. Camming surface 198 of rotor 24 is seen most clearly in FIGS. 7A-E and is provided by an arcuate section of the outer circumference of the rotor. The radius of camming surface 198 serves to displace beam spring 136 radially outward sufficiently to disengage contact 132 from contact pin 220 until the rotor is rotated sufficiently rightward or clockwise for beam spring 136 to move inward into a radially-inward extending discontinuity in the camming surface which thereby allows engagement of contact members 132 and 220.

Referring to FIG. 7A, the washer/wiper switch assembly 110 is depicted in the configuration providing an "off" electrical condition for both the wash pump motor and the wiper motor, and is generally analogous to FIG. 4A.

FIG. 7B illustrates in phantom the washer switch assembly 11 actuated rearwardly to its limit to energize the pump motor. However, unlike the somewhat analogous situation of FIG. 4B, the wiper carriage assembly 112 is not thereby actuated. Specifically, because the cantilevered arm 178 of torsion spring 176 on rotor 24 has been shortened, it no longer extends into the path of drive member 74 on the wash actuator carriage 62. Thus, the wash motor may be energized without automatically also energizing the wiper motor. It will be appreciated that such difference between the FIG. 1 and FIG. 5 embodiment constitutes a design option.

Referring to FIG. 7C, the rotor 24 is illustrated as having been manually rotated clockwise through a small angle from the "off" position to a position which places it over one of the several contact fingers 120' in the array of delay contacts. The several contact fingers 120' in the array are connected to the leads 196 of resistor 195 in a sequence which provides maximum delay between wiper sweeps at the closest position to the "off" position and minimum delay as rotor 24 is rotated further clockwise to the limit of the array of contacts 120'. The next small incremental clockwise rotation of rotor 24 achieves the position which provides "low" speed operation of the wiper motor. Detenting of the rotor 24 at this "low" speed position is provided by an appropriate detent notch in the contact surface 51 of the housing for engagement by the detent member 52 carried by the rotor in opening 30d.

FIG. 7D illustrates the rotor 24 having been rotated further clockwise to a limit position in which the discontinuity in the rotor camming surface 198 has allowed beam spring 136 to flex radially inwardly and bring contacts 132 and 220 into engagement. Such position electrically corresponds with the "high" speed operation of the wiper motor. Moreover, rotor 24 will be yieldingly held in this position by the detenting effect of the cam follower portion of the beam spring 136 acting on the rotor to resist counterclockwise motion. A small stop 88 formed in the base housing 15 also limits further clockwise rotation of rotor 24.

Referring to FIG. 7E, the rotor 24 is shown displaced counterclockwise from its "off" position to provide the "mist" operation referred to above in conjunction with the description of FIG. 4D. As was discussed therein, this position effects temporary "low" speed operation of the wiper motor and is discontinued when the actuator arm 60 is released. Like the FIG. 4D embodiment, the bias for returning the rotor to the "off" position is provided by flexure of the cantilevered arm 178 of torsion spring 176. However, the FIG. 5 embodiment does differ from the FIG. 1 embodiment in that because the length of cantilevered spring arm 178 has been shortened, it can no longer utilize the drive member 74 of washer switch 11 as a stop member. Accordingly, a stop rod 89 depends, like stop rod 84, from the undersurface of cover portion 16 and is positioned to engage and limit counterclockwise displacement of the shortened spring arm 178 to provide the requisite return bias to the rotor 24.

Although this invention has been shown and described with respect to detailed embodiments thereof, it will be understood by those skilled in the art that various changes in form and detail thereof may be made without departing from the spirit and scope of the claimed invention.

Having thus described a typical embodiment of our invention, that which is claimed as new and desired to secure by letters Patent of the United States is:

1. In a switch having a carriage with a pair of substantially opposite sides, a contact surface of conductive parts facing one of said carriage sides and a reaction surface facing the other of said carriage sides in spaced relation therewith, a contact mechanism being carried by said carriage, said carriage being movable relative to and substantially parallel with said contact surface and said reaction surface, the improvement wherein said carriage has a plurality of openings extending therethrough each substantially perpendicular to said contact surfaces and said reaction surface and the contact mechanism comprises a respective plurality of plungers, springs, conductive contact members and a common conductive retainer, each said contact member being slideably disposed in a respective one of said carriage openings and adapted for engagement with said contact surface, each said spring being interposed in compression between a respective said contact member and a respective said plunger, each said plunger being in contact with said reaction surface whereby to urge the respective said contact member into engagement with said contact surface, each said plunger including a head portion and a pin depending from said head portion, each said contact member being hollow and open at its end facing said reaction surface and having an axially-facing shoulder for engaging said spring and being of such length that when one end is in engagement with said contact surface, the opposite end portion extends beyond the surface of said carriage facing said reaction surface, said retainer being rigidly affixed to said opposite end portion of the respective said contact members in spaced relation with said carriage to connect said contact members conductively and structurally in common, each said spring being a coil spring, and wherein an end of each said spring is in axial engagement with said shoulder of the respective said contact member and the other end of each said spring coaxially encircles said plunger pin and is in axial engagement with said plunger head portion.

2. The switch of claim 1 wherein said shoulder of said contact member is within said hollow and faces said open end.

3. The switch of claim 1 wherein the separation of said reaction surface from said contact surface varies as a function of the position of said carriage thereby to vary the force by which said spring urges said contact member into engagement with said contact surface.

4. The switch of claim 3 wherein the contour of said reaction surface is varied to provide a camming surface.

5. The switch of claim 1 wherein said plurality is two and said retainer is an elongate member, said two contact members each being rigidly affixed to said retainer member near respective opposite ends of said retainer.

6. The switch of claim 5 wherein said retainer member is substantially rigid and includes a pair of openings therethrough near the opposite ends thereof, each said contact member being positioned within a respective opening in said retainer member and being rigidly affixed thereto by riveting of said contact member.

7. The switch of claim 5 wherein said retainer member is sufficiently thin and so structured in one direction as to allow limited resilient deflection of one end of said retainer relative to the other end in a direction axially of said openings in said carriage and is sufficiently wide in a direction transversely of said one direction to be substantially rigid to forces applied in said direction transversely of said one direction.

8. The switch of claim 2 wherein said plunger head portion is of greater diameter than said contact member and includes an axially-extending neck portion which is of lesser diameter than said hollow in said contact member but which is of greater diameter than said plunger pin, said spring being in axial engagement with said neck portion of said plunger head portion.

9. The switch of claim 8 wherein said carriage and said contact mechanism are contained within a plastic housing, said reaction surface being provided by an internal surface of said housing and wherein said plunger is of molded plastic having a relatively low coefficient of friction.

10. The switch of claim 9 wherein said carriage is manually actuatable to effect said movement relative to said reaction surface and said contact surface.

* * * * *